United States Patent Office 3,004,843
Patented Oct. 17, 1961

3,004,843
CONTROL OF AQUATIC PLANTS
Melvin J. Josephs, Midland, Mich., assignor to The Dow Chemical Company, Midland, Mich., a corporation of Delaware
No Drawing. Filed Aug. 10, 1959, Ser. No. 832,472
3 Claims. (Cl. 71—2.3)

This invention relates to herbicides and is particularly concerned with a composition and method for killing aquatic plants. The expression "aquatic plants" as herein employed refers to vegetative organisms normally growing in water and in which the leaf and stem parts are largely submerged. The expression is inclusive of water plants which are not rooted such as Ceratophyllum spp. (coontail), and rooted aquatic weeds such as Anacharis spp. (water weed), *Lysimastrum nummularia* (moneywort), *Cabomba caroliniana* (fanwort) and Salvinia spp.

Aquatic plants growing out of place are commonly called weeds, and millions of dollars are expended annually for their control. In irrigation ditches, canals, aqueducts, rivers and streams of pleasure and commerce these plants hinder the flow of water and cause excessive sedimentation. Further such growth will result in high water loss from evaporation and interfere with navigation. Mechanical operations, such as dredging, chaining, burning and mowing are still the principal means of control. The shortcomings of the latter methods have included superficial burning of exposed leaves without the killing of roots thus permitting quick regrowth of the plants. More recently, efforts have been made at chemical control but many chemical compounds useful for killing land weeds have been found to be ineffective for aquatic weed control. Also, many of the previously employed chemicals are specific in their action and control only a few species, thus leading to increased growth activity on the part of unaffected plants or affect only adult plants or are inconsistent in their effectiveness. Thus, chlorine gas effectively destroys adult plants but does not kill root buds which may later germinate and grow. Further, compounds such as copper sulfate, are inconsistent in their effectiveness. In addition, it is desirable for general application, that the chemical be either selective to aquatic plants without having toxic properties toward mammals and terrestrial plants or that the chemical be applicable in low concentrations that significant residues of the aquatic herbicide are not retained in the water body after control is achieved. Thus, such chemicals which control aquatic weeds such as inorganic arsenicals and chlorinated hydrocarbons are of limited application because of toxicity to animal life. Additionally, solid or liquid compositions which can be applied directly to the loci needing treatment are advantageous over chemicals such as chlorine gas with which handling during application is difficult.

It is an object of the present invention to provide a new and improved method for the control and suppression of the growth of aquatic plants. Another object is the provision of a method for the treatment of the water adjacent to aquatic plants in irrigation ditches, canals, ponds, streams or other waterways to control the growth of the plants. A further object is the provision of a method which will control the growth of a large variety of aquatic plant species. An additional object is the provision of novel compositions to be employed in the new methods for suppressing the growth of aquatic plants. Other objects will become apparent from the following specification and claims.

According to the present invention, it has been found that α,α,α-trifluoro-4-nitro-m-cresol and its salts are very toxic to aquatic plants when such compound or a composition in which it is employed, is introduced into water adjacent to the submersed portions of aquatic plants. It is among the advantages of the present invention that the compound of the present invention accomplishes a quick kill of the stems and leaves of aquatic plants accompanied by the control in a short period of time of the roots. By "control" as herein employed is meant kill or inhibition of growth and/or reproduction of plant or plant parts. A particular advantage of the present invention is the wide range of water temperatures over which the compound is effective. Thus, the treatment can be carried out at almost any water temperature which will permit the growth and development of aquatic plants. A still further advantage of the methods and compositions of the present invention are their ability to control a wide variety of aquatic plants.

The expression "α,α,α-trifluoro-4-nitro-m-cresol compound" as employed in the specification and claims is meant the parent phenol having the formula

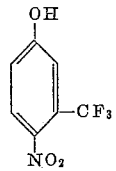

and its alkali metal, amine and ammonium salts. Suitable salts include sodium, potassium, ammonium and amines salts with such amines as cyclohexylamine, methylamine, ethylamine, isopropylamine, tertiary-butylamine, normal-hexylamine, normal-amylamine, normal-heptylamine, normal-octylamine, 1,1,3,3-tetramethylbutylamine, diethylamine, dipropylamine, diisopropylamine, dibutylamine, tributylamine, isobutylamine, diamylamine, triamylamine, diisobutylamine, di-secondary-butylamine, 1,3-dimethylbutylamine, bis(1,3-dimethylbutyl)amine, isoamylamine, ethylenediamine, propylenediamine, diethylenetriamine, triethylenetetramine, tetraethylenepentamine, tripropylenetetramine, tetrapropylenepentamine, morpholine, pyrrolidine, piperidine and piperazine.

α,α,α-Trifluoro-4-nitro-m-cresol is a substantially colorless crystalline solid soluble in many organic solvents such as acetone, cyclohexanone, dimethylformamide and dimethyl sulfoxide and substantially insoluble in water. The ammonium salts of α,α,α-trifluoro-4-nitro-m-cresol are yellow or orange colored crystalline solids soluble in solvents such as acetone, cyclohexanone, methyl ethyl ketone, dimethylformamide, dimethyl sulfoxide, ethanol, isopropanol, aqueous alkali, monoalkyl ethers of polyalkylenepolyglycols and water and substantially insoluble in petroleum ether, kerosene, xylene and diethyl ether.

In the practice of the present invention, distribution of α,α,α-trifluoro-4-nitro-m-cresol compound in water adjacent to growing aquatic plants in a dosage effective to kill the plants is essential. In general, good results are obtained when the compound is distributed in water adjacent growing aquatic weeds in an amount of from about 15 to about 100 parts or more by weight based on the weight of the free phenol per million parts by weight of the aqueous medium. The exact dosage to be employed is dependent upon the plant mass to be treated and whether or not the exposure is carried out in a moving stream such as a canal or in standing water such as a ditch or a pond. In standing water, good results are obtained when employing minimal dosages of the compound. In moving streams, somewhat higher concentrations are required in order to provide the contacting of the plant with a herbicidal amount of the α,α,α-trifluoro-4-nitro-m-cresol compound. It has been found that for most applications in standing water, applications in an amount of from about 15 to about 25 parts by weight based on the free phenol per million parts by weight of the water medium is adequate.

The method of the present invention may be carried out by distributing a growth inhibiting amount of α,α,α-trifluoro-4-nitro-m-cresol compound or a composition containing the compound in water adjacent to the undesirable plants. In such usage, the α,α,α-trifluoro-4-nitro-m-cresol compound may be modified with one or more of a plurality of additaments or herbicide adjuvants, including water or inert organic solvents, surface active dispersing agents, finely divided solids. The treating composition may be in the form of liquid solutions or dispersions, or in the form of solid granules, prills or powders. Preferred compositions of the present invention comprise emulsifiable liquid concentrates and wettable powder concentrates. Such concentrates are readily and conveniently adapted to be distributed in water adjacent to aquatic plants to provide in the water growth inhibiting concentrations of the toxicant.

The exact concentration of the α,α,α-trifluoro-4-nitro-m-cresol compound to be employed in compositions for the treatment of aquatic plant infested loci is not critical and may vary provided the required dosage of effective agent is supplied in the water adjacent to the plants. The concentration of toxicant in liquid and solid concentrates employed to supply the desired dosage may be from about 0.005 to 95 percent by weight based on the weight of the free phenol.

Liquid compositions containing the desired amount of the α,α,α-trifluoro-4-nitro-m-cresol compound may be prepared by dissolving or dispersing the toxicant compound in an organic liquid such as acetone, xylene, alcohols, alkyl ethers of glycols and polyglycols, toluene, methylene chloride, chlorobenzene and dimethylformamide, dimethylsulfoxide or a mixture of one or more such liquids with or without added dispersing agent, or by dispersing the toxicant compound in water with the aid of a suitable surface active dispersing agent. The aqueous compositions may contain one or more water-miscible or water-immiscible solvents for the α,α,α-trifluoro-4-nitro-m-cresol compound together with a surface active dispersing agent. The presence of the latter is desirable even when a water-miscible solvent is employed in order to assure good dispersion of the toxicant in the aqueous media to be treated.

In the preparation of solid compositions, the α,α,α-trifluoro-4-nitro-m-cresol compound is dispersed in and on a finely divided inert solid such as bentonite, fuller's earth, attapulgite and other clays. Such compositions may contain other finely divided solid carriers such as talc and chalk. In such operations the solid carrier is mechanically ground with the α,α,α-trifluoro-4-nitro-m-cresol compound. When the solid composition is a wettable powder composition, a surface-active dispersing agent is intimately mixed with the α,α,α-trifluoro-4-nitro-m-cresol compound and solid carrier. Alternatively, the wettable powder may be an intimate mixture of the toxicant and dispersing agent obtained by grinding together the components without the addition of other inert solids.

The surface-active dispersing agents are generally employed in the amount of from 0.1 to 20 percent by weight of the combined weight of the agent and α,α,α-trifluoro-4-nitro-m-cresol compound in the composition. Dispersing and emulsifying agents which may be employed in the compositions include the condensation products of alkylene oxides with phenols and organic acids, alkyl aryl sulfonates, alkylated aryl polyether alcohols, polyoxyalkylene derivatives of sorbitan esters, complex ether alcohols, mahogany soaps and the like.

The method of the present invention is carried out by dispersing a growth inhibiting amount of the α,α,α-trifluoro-4-nitro-m-cresol compound into the water adjacent to the submersed portions of the plants in a pond, lake, river, canal, stream, ditch or other watercourse. This is readily accomplished by introducing the α,α,α-trifluoro-4-nitro-m-cresol compound or a composition containing the compound into water above a plant mass so as to permit its dispersion in the water adjacent the growing plant. The introduction of the toxicant into the water adjacent aquatic weeds conveniently may be accomplished by spraying or sprinkling the composition onto the surface or dispersing the composition beneath the surface of the water or by metering the composition into the vortex of a rapidly turning propeller to obtain maximum distribution of the compound in the water.

In moving water courses water flow may be employed to distribute the α,α,α-trifluoro-4-nitro-m-cresol compound. Thus, the toxicant may be introduced into the water in such a manner that it is distributed into and over the plant growth area for a sufficient exposure time to kill the plants. In general, an exposure time of about 2 hours results in complete control of the plants although with some species and lower concentrations, longer periods may be required.

The following examples illustrate the invention but are not to be construed as limiting.

EXAMPLE 1

In a representative operation, 0.005 part by weight of α,α,α-trifluoro-4-nitro-m-cresol, 10 parts of an acetone solution containing 0.1 percent by weight of a dimeric alkylated aryl polyether alcohol (Triton X–155) and 90 parts of water were mixed together to provide a liquid water dispersible concentrate. This concentrate was further diluted with water to prepare aqueous compositions containing 25 parts by weight of toxicant per million parts by weight of water. These compositions were employed for the treatment of Cabomba caroliniana (Cabomba), Salvinia rotundifolia (Salvinia), Lysimastrum nummularia (moneywort), Anacharis spp. (water weed) and Ceratophyllum sp. (coontail), growing in a series of small tanks. In such operations, the aqueous compositions were poured into the tanks to expose the plants to the above concentrations α,α,α-trifluoro-4-nitro-m-cresol. After 24-hour exposure time, the tanks were flushed and refilled with fresh water. Thereafter the water was changed daily by overflow filling. Other tanks containing the named species were left untreated to serve as checks.

At regular intervals observations were carried out to ascertain what control of growth had been obtained. Three weeks following the treating operations, the observations showed the controls of the growth of the named plant species as set forth in the following table:

Table I

| Plant species: | Percent kill |
|---|---|
| Anacharis | 100 |
| Cabomba | 100 |
| Moneywort | 99 |
| Salvinia | 100 |
| Ceratophyllum | 100 |

At the time of observation, the untreated check tanks were found to support luxurious and succulent growth of the named plant species.

EXAMPLE 2

An operation was carried out with certain of the plants in a manner similar to that described in Example 1 except that the plants were exposed to a concentration of 100 parts by weight of α,α,α-trifluoro-4-nitro-m-cresol per million parts of water for a period of 2 hours. The results are set forth in Table II.

Table II

| Plant species: | Percent kill |
|---|---|
| Anacharis | 85 |
| Salvinia | 100 |
| Ceratophyllum | 100 |

EXAMPLE 3

An operation was carried out in a manner similar to that described above except that the plants were exposed to a concentration of 100 parts by weight (based on the weight of the free phenol) of a salt of α,α,α-trifluoro-4-nitro-m-cresol per million parts by weight of water for a period of 2 hours. The results are set forth in Table III.

Table III

| Indicated Salt of α,α,α-Trifluoro-4-nitro-m-cresol | Percent Kill of Indicated Plant Species | | |
|---|---|---|---|
| | Anacharis | Cabomba | Moneywort |
| Diethylenetriamine | 98 | 98 | 98 |
| Ethylenediamine | 100 | 99 | 90 |
| Morpholine | 100 | 98 | 95 |
| Diethylamine | 100 | 95 | 95 |
| Ammonium | 100 | 98 | 90 |

EXAMPLE 4

In another similar operation, the plants were exposed to various salts at a concentration of 25 parts by weight based on the weight of free phenol per million parts by weight of water for 24 hours. The results are set forth in Table IV.

Table IV

| Indicated Salt of α,α,α-Trifluoro-4-nitro-m-cresol | Percent Kill of Indicated Plant Species | | | | |
|---|---|---|---|---|---|
| | Anacharis | Cabomba | Moneywort | Salvinia | Ceratophyllum |
| Diethylenetriamine | 100 | 100 | 99 | 100 | 100 |
| Ethylenediamine | 100 | 100 | 90 | 100 | 95 |
| Morpholine | 99 | 100 | 95 | 100 | 100 |
| Methylamine | 100 | 100 | 90 | 100 | 100 |
| Diethylamine | 100 | 100 | 90 | 100 | 95 |

EXAMPLE 5

In similar operations, good controls of aquatic weeds are obtained at both 2 and 24 hour exposure times when sodium and potassium salts of α,α,α-trifluoro-4-nitro-m-cresol are employed at varying concentrations.

EXAMPLE 6

Concentrate compositions suitable for use as such or for preparing aqueous dispersions to be employed to distribute growth inhibitive amounts of α,α,α-trifluoro-4-nitro-m-cresol compound in water adjacent to growing aquatic weeds are prepared as follows:

Fifty parts by weight of α,α,α-trifluoro-4-nitro-m-cresol, sodium salt and 5 parts by weight of Triton X–155 are mixed and ground together to prepare a water dispersible concentrate composition.

An emulsifiable concentrate is prepared by mechanically mixing and grinding together 25 parts by weight of trimethylamine salt of α,α,α-trifluoro-4-nitro-m-cresol, 10 parts by weight of Triton X–155 and 65 parts by weight of xylene.

25 parts by weight of cyclohexylamine salt of α,α,α-trifluoro-4-nitro-m-cresol, 71 parts of fuller's earth, 2 parts of an alkyl aryl sulfonate (Nacconal NR) and 2 parts of a polymerized sodium salt of a substituted benzoid alkyl sulfonic acid (Daxad No. 27) are mechanically mixed and ground together to prepare a concentrate composition in the form of a wettable powder.

A mixture of 20 parts by weight of piperazine salt of α,α,α-trifluoro-4-nitro-m-cresol, 0.1 part of Nacconal NR, 0.1 part of Daxad No. 27 and 200 parts of water are ball-milled together to prepare a water dispersible liquid concentrate composition.

EXAMPLE 7

A concentrate composition is prepared containing 0.005 part by weight of the sodium salt of α,α,α-trifluoro-4-nitro-m-cresol based on weight calculated as the free phenol, 10 parts by weight of an acetone solution containing 0.1 percent by weight of Triton X–155 and 90 parts of water. The concentrate composition is applied to a standing body of water supporting the growth of Cabomba, Salvinia, moneywort, water weed and coontail in amount sufficient to supply 15 parts by weight of toxicant per million parts by weight of water and is found to produce substantially complete kill of the undesirable species.

The salt of α,α,α-trifluoro-4-nitro-m-cresol may be prepared by mixing together α,α,α-trifluoro-4-nitro-m-cresol with a base according to conventional procedures. Good results are obtained when substantially stoichiometric amounts of reactants are employed. When the base is a polybasic amine, "stoichiometric amount" is based on the basic nitrogen present in the amine. Thus, with a dibasic amine, a one-half molar proportion of the dibasic amine for each molar proportion of the cresol supplied a stoichiometric amount. However, a slight excess of either reactant will also give good results. The reaction may be carried out in the temperature range of from 15° to 100° C. Generally, some heating is employed to facilitate the reaction. A solvent such as diethyl ether, ethanol or isopropanol may be employed, if desired.

I claim:

1. A method for inhibiting the growth of aquatic plants which includes the step of introducing into the water adjacent the submersed portions of the plants a growth inhibiting amount of an α,α,α-trifluoro-4-nitro-m-cresol compound, said α,α,α-trifluoro-4-nitro-m-cresol compound being selected from the group consisting of α,α,α-trifluoro-4-nitro-m-cresol and its alkali metal, ammonium, and amine salts.

2. A method for inhibiting the growth of aquatic plants which includes the step of introducing into the water adjacent the submersed portions of plants at least 15 parts per million by weight of an α,α,α-trifluoro-4-nitro-m-cresol compound, said α,α,α-trifluoro-4-nitro-m-cresol compound being selected from the group consisting of α,α,α-trifluoro-4-nitro-m-cresol and its alkali metal, ammonium, and amine salts.

3. A method for inhibiting the growth of aquatic plants which includes the step of introducing into the water adjacent to the submersed portions of the plants a composition comprising an α,α,α-trifluoro-4-nitro-m-cresol compound as an active ingredient in intimate admixture with a herbicide adjuvant, said composition being employed in an amount sufficient to supply at least 15 parts per million by weight of the α,α,α-trifluoro-4-nitro-m-cresol compound in the water, and wherein said α,α,α-trifluoro-4-nitro-m-cresol compound is selected from the group consisting of α,α,α-trifluoro-4-nitro-m-cresol and its alkali metal, ammonium, and amine salts.

References Cited in the file of this patent

UNITED STATES PATENTS 2,489,423    Lawson et al. _____ Nov. 29, 1949

OTHER REFERENCES

Whalley in "Jour. Chem. Soc.," 1950, pages 2792–94.
Pettit et al.: "Chemical Abstracts," vol. 49, 1955, col. 10,286.